US012309464B2

(12) United States Patent
Li et al.

(10) Patent No.: US 12,309,464 B2
(45) Date of Patent: May 20, 2025

(54) GRAPHICS ENGINE AND GRAPHICS PROCESSING METHOD APPLICABLE TO PLAYER

(71) Applicant: SHANGHAI BILIBILI TECHNOLOGY CO., LTD., Shanghai (CN)

(72) Inventors: Chaoran Li, Shanghai (CN); Hao Wang, Shanghai (CN); Zhong Dong, Shanghai (CN); Zhaozheng Wang, Shanghai (CN)

(73) Assignee: SHANGHAI BILIBILI TECHNOLOGY CO., LTD., Shanghai (CN)

( * ) Notice: Subject to any disclaimer, the term of this patent is extended or adjusted under 35 U.S.C. 154(b) by 82 days.

(21) Appl. No.: 18/033,788

(22) PCT Filed: Aug. 9, 2021

(86) PCT No.: PCT/CN2021/111381
§ 371 (c)(1),
(2) Date: Apr. 25, 2023

(87) PCT Pub. No.: WO2022/095526
PCT Pub. Date: May 12, 2022

(65) Prior Publication Data
US 2023/0403437 A1    Dec. 14, 2023

(30) Foreign Application Priority Data
Nov. 5, 2020   (CN) .......................... 202011223807.3

(51) Int. Cl.
*H04N 21/488* (2011.01)
*H04N 21/431* (2011.01)

(52) U.S. Cl.
CPC ..... *H04N 21/4884* (2013.01); *H04N 21/4314* (2013.01)

(58) Field of Classification Search
None
See application file for complete search history.

(56) References Cited

U.S. PATENT DOCUMENTS 9,317,175 B1    4/2016   Lockhart
11,095,938 B2 *  8/2021  Welche .............. H04N 21/8173
(Continued)

FOREIGN PATENT DOCUMENTS

CN    102662646 A    9/2012
CN    103999046 A    8/2014
(Continued)

OTHER PUBLICATIONS

International Patent Application No. PCT/CN2021/111381; Int'l Search Report; dated Nov. 8, 2021; 3 pages.

*Primary Examiner* — Mushfikh I Alam
(74) *Attorney, Agent, or Firm* — BakerHostetler (57) ABSTRACT

The present application discloses a graphics processing method applicable to a player, including: performing data interaction between a graphics engine and the player to obtain playback data; and executing, by the graphics engine, a graphics processing operation on a next frame of the player based on the playback data and a preset logic. In the present application, a communication mechanism is set between the engine scene layer of the graphics engine and the player, such that the engine scene layer and the player interact with each other in terms of playback data of a video being played, so that the engine scene layer can efficiently obtain the playback data for graphics processing operations, which is applicable to a video playing service and ensures a video rendering effect.

20 Claims, 7 Drawing Sheets

(56) References Cited

U.S. PATENT DOCUMENTS

| | | | | |
|---|---|---|---|---|
| 2016/0014473 | A1* | 1/2016 | Sun | H04N 21/44008 |
| | | | | 725/32 |
| 2019/0132381 | A1* | 5/2019 | Momchilov | G06F 3/01 |
| 2019/0139266 | A1* | 5/2019 | Budagavi | G06T 9/00 |
| 2019/0200047 | A1 | 6/2019 | Cui et al. | |
| 2020/0007940 | A1* | 1/2020 | Li | H04N 21/4788 |
| 2020/0306631 | A1* | 10/2020 | Karlsson | A63F 13/352 |
| 2022/0011929 | A1* | 1/2022 | Han | H04N 21/4316 |
| 2022/0094941 | A1* | 3/2022 | Kondrad | H04N 21/85406 |

FOREIGN PATENT DOCUMENTS

| | | |
|---|---|---|
| CN | 104144351 A | 11/2014 |
| CN | 105597321 A | 5/2016 |
| CN | 109408175 A | 3/2019 |
| CN | 109816763 A | 5/2019 |
| CN | 110213636 A | 9/2019 |
| CN | 110784773 A | 2/2020 |
| CN | 111031400 A | 4/2020 |
| CN | 111408138 A | 7/2020 |
| CN | 111432276 A | 7/2020 |
| CN | 111556325 A | 8/2020 |
| CN | 111796826 A | 10/2020 |
| CN | 112423111 A | 2/2021 |
| CN | 112995692 A | 6/2021 |
| WO | WO 2018/121556 A1 | 7/2018 |
| WO | WO 2020/156264 A1 | 8/2020 |

* cited by examiner

GRAPHICS ENGINE AND GRAPHICS PROCESSING METHOD APPLICABLE TO PLAYER

CROSS-REFERENCE TO RELATED APPLICATIONS

The present application is the U.S. National Stage of International Application No. PCT/CN2021/111381, filed on Aug. 9, 2021, which claims priority to Chinese Patent Application No. 202011223807.3, filed on Nov. 5, 2020, and entitled "GRAPHICS ENGINE AND GRAPHICS PROCESSSING METHOD APPLICABLE TO PLAYER", both of which are incorporated herein by reference in their entireties.

TECHNICAL FIELD

The present application relates to the field of graphics processing technologies, and in particular, to a graphics engine, a graphics processing method and system applicable to a player, a computer device, and a computer-readable storage medium.

BACKGROUND ART

With the development of Internet, various types of electronic devices such as portable computers, personal computers, smartphones, and tablet computers are widely applied. In order to improve user experience, an increasing number of operating systems or applications require the support of graphics engines, by using which two-dimensional graphics or three-dimensional graphics are rendered. The existing graphics engines include OpenSceneGraph (OSG) that is a three-dimensional rendering engine, a Unity engine, etc.

In the era of mobile terminals, service scenes are more complex, different service scenes require different engine functions, and there are also higher requirements for light weight. Some companies have developed different graphics engines according to their own service requirements, such as cocos2d-x, Apple's SpriteKit, Google's skia for Flutter, Alibaba's Gcanvas, etc. Various other companies are also designing engines according to their own unique service requirements. The inventors realized that none of the above graphics engines can effectively adapt to video playing services.

SUMMARY OF THE INVENTION

An objective of embodiments of the present application is to provide a graphics engine, a graphics processing method and system applicable to a player, a computer device, and a computer-readable storage medium, to solve the problem of adaptation of the graphics engine to video service scenes.

An aspect of the embodiments of the present application provides a graphics engine, including: an engine scene layer, configured to execute a graphics processing operation according to a preset logic, where executing the graphics processing operation according to the preset logic includes: interacting with a player based on a predetermined transmission protocol to obtain playback data, and executing the graphics processing operation based on the playback data and the preset logic.

Optionally, the playback data includes a video playing progress of the player; and executing the graphics processing operation based on the playback data and the preset logic includes: obtaining bullet-screen comment position data of each bullet-screen comment based on the video playing progress and the preset logic.

Optionally, the playback data includes request data for requesting the bullet-screen comment to be closed; and executing the graphics processing operation based on the playback data and the preset logic includes: hiding the bullet-screen comment based on the request data and the preset logic.

Optionally, the graphics engine further includes: a view layer, configured to transfer a message to the engine scene layer. The message includes: a frame update signal, a touch event, a scene coordination signal, and/or interaction data with the player.

Optionally, the graphics engine further includes: a runtime layer, configured to run JS codes, where the runtime layer is bound to a JS application programming interface, the JS application programming interface is used as an external open interface of the graphics engine and configured for interaction between the graphics engine and a third-party function module.

Optionally, the graphics engine further includes: a shell layer, used as an interaction interface between the graphics engine and a system platform and configured to adapt the graphics engine to a target system platform.

Optionally, the engine scene layer is further configured to: combine a plurality of textures into one texture.

Optionally, the engine scene layer is further configured to: update node data of a plurality of nodes in a scene; generate a plurality of rendering instructions for the plurality of nodes based on the node data of the plurality of nodes, where the plurality of nodes include one or more first rendering nodes that do not require an independent rendering environment and one or more second rendering nodes that require an independent rendering environment; cache the plurality of rendering instructions into a plurality of rendering queues, where the plurality of rendering queues include a first rendering queue and one or more second rendering queues, the first rendering queue is used to cache a rendering instruction of each first rendering node, and each second rendering queue corresponds to one second rendering node and is used to cache a rendering instruction of a corresponding second rendering node; traverse the plurality of rendering queues to combine a plurality of rendering instructions having a same target parameter into one rendering batch, to obtain a plurality of rendering batches; and call a graphics library or hardware based on each rendering batch.

An aspect of the embodiments of the present application further provides a graphics processing method applicable to a player, including: performing data interaction between a graphics engine and the player to obtain playback data; and executing, by using the graphics engine, a graphics processing operation on a next frame of the player based on the playback data and a preset logic.

Optionally, a transmission protocol for interaction between the graphics engine and the player is pre-agreed on.

Optionally, the playback data includes a video playing progress of the player; and executing, by using the graphics engine, the graphics processing operation on the next frame of the player includes: obtaining bullet-screen comment position data of each bullet-screen comment based on the video playing progress and the preset logic.

Optionally, the playback data includes request data for requesting the bullet-screen comment to be closed; and executing, by using the graphics engine, the graphics processing operation on the next frame of the player includes: hiding the bullet-screen comment based on the request data and the preset logic.

Optionally, executing, by using the graphics engine, the graphics processing operation on the next frame of the player includes: combining a plurality of textures into one texture.

Optionally, executing, by using the graphics engine, the graphics processing operation on the next frame of the player includes: updating node data of a plurality of nodes in a scene; generating a plurality of rendering instructions for the plurality of nodes based on the node data of the plurality of nodes, where the plurality of nodes include one or more first rendering nodes that do not require an independent rendering environment and one or more second rendering nodes that require an independent rendering environment; caching the plurality of rendering instructions into a plurality of rendering queues, where the plurality of rendering queues include a first rendering queue and one or more second rendering queues, the first rendering queue is used to cache a rendering instruction of each first rendering node, and each second rendering queue corresponds to one second rendering node and is used to cache a rendering instruction of a corresponding second rendering node; traversing the plurality of rendering queues to combine a plurality of rendering instructions having a same target parameter into one rendering batch, to obtain a plurality of rendering batches; and calling a graphics library or hardware based on each rendering batch.

An aspect of the embodiments of the present application further provides a graphics processing system applicable to a player, including: an interaction module, configured to perform data interaction between a graphics engine and the player to obtain playback data; and a graphics processing module, configured to execute, by using the graphics engine, a graphics processing operation on a next frame of the player based on the playback data and a preset logic.

An aspect of the embodiments of the present application further provides a computer device including a memory, a processor, and computer-readable instructions stored on the memory and executable on the processor, where when the processor executes the computer-readable instructions, the following steps are implemented: performing data interaction between a graphics engine and a player to obtain playback data; and executing, by using the graphics engine, a graphics processing operation on a next frame of the player based on the playback data and a preset logic.

An aspect of the embodiments of the present application further provides a computer-readable storage medium storing computer-readable instructions that may be executed by at least one processor to cause the at least one processor to execute the following steps: performing data interaction between a graphics engine and a player to obtain playback data; and executing, by using the graphics engine, a graphics processing operation on a next frame of the player based on the playback data and a preset logic.

According to the graphics engine, the graphics processing method and system applicable to a player, the computer device, and the computer-readable storage medium provided in the embodiments of the present application, for adaptation to video playing services, a communication mechanism is set between the engine scene layer and the player, such that the engine scene layer and the player interacts with each other in terms of playback data of a video being played, so that the graphics engine can efficiently obtain the playback data for a graphics processing operation, thereby ensuring a video rendering effect.

DETAILED DESCRIPTION OF EMBODIMENTS

To make the objectives, technical solutions, and advantages of the present application clearer and more comprehensible, the present application will be further described in detail with reference to the accompanying drawings and embodiments. It should be understood that the specific embodiments described herein are merely intended to explain the present application, and are not intended to limit the present application. All other embodiments obtained by those of ordinary skill in the art based on the embodiments of the present application without creative efforts shall fall within the protection scope of the present application.

It should be noted that the descriptions related to "first", "second", and the like in the embodiments of the present application are merely used for the illustrative purpose, and should not be construed as indicating or implying the relative importance thereof or implicitly indicating the number of technical features indicated. Thus, features defined with "first" and "second" may explicitly or implicitly include at least one of the features. In addition, technical solutions of various embodiments can be combined with each other, but they must be based on the implementation by those of ordinary skill in the art. When a combination of technical solutions is contradictory or cannot be implemented, it should be considered that such a combination of the technical solutions neither exists, nor falls within the protection scope claimed by the present application.

In the description of the present application, it should be understood that, the reference numerals of steps do not indicate the order of execution of the steps, but are merely to facilitate the description of the present application and differentiation between the steps, and thus will not be interpreted as limiting the present application.

Terms in the present application are explained below:

Graphical element: any graphic is formed by combining basic patterns such as points, lines, and surfaces or repeated patterns, and these patterns are called graphical elements.

Graphics engine, a functional component configured to draw graphics. With the rapid development of graphics software and hardware technologies, graphics engines have also been developed rapidly and applied in the fields of animation, virtual reality, game development, simulation, and the like.

DirectX (a collection of graphics interfaces developed by Microsoft based on the common object model) and Open Graphics Library (OpenGL) that is an open underlying graphics library can be configured to implement writing of three-dimensional graphics. However, it is more difficult to design a specific object in a scene by using DirectX and OpenGL, and they focus more on basic graphical elements. Therefore, they are later encapsulated to form a more convenient and functional development environment, which may be called graphics engines, such as OSG and Unity.

In the era of mobile terminals, service scenes are more complex, different service scenes require different engine functions, and there are also higher requirements for light weight. Some companies have developed different graphics engines according to their own service requirements, such as cocos2d-x, Apple's SpriteKit, Google's skia for Flutter, Alibaba's Gcanvas, etc. Various other companies are also designing engines according to their own unique service requirements.

Among the above graphics engines, there is a lack of such a graphics engine, which can not only meet the requirements of cross-platform and light weight, but can also interact with the player, especially adapt to the video service scenes, and at the same time have good performance and can support various services.

The present application aims to provide a graphics engine or a graphics processing method especially adapting to a player, which can support cross-platform and realize light weight, achieve the purpose of easy use, and fully fit company service scenes: The graphics engine can not only perform data interaction well with the player, but also can provide enough technical support for other services. The present application further aims to optimize a rendering process, thereby reducing computing resources consumed by graphics rendering and improving the rendering efficiency.

It should be noted that the graphics engine provided by the present application can be configured to add high-performance 2D/3D content having smooth animation to applications, or to create games by using a set of advanced tools based on 2D/3D games. The graphics engine provided in the present application can also be integrated into the applications, and it is responsible for executing graphics engine software packages.

Embodiment 1

Figure 1:
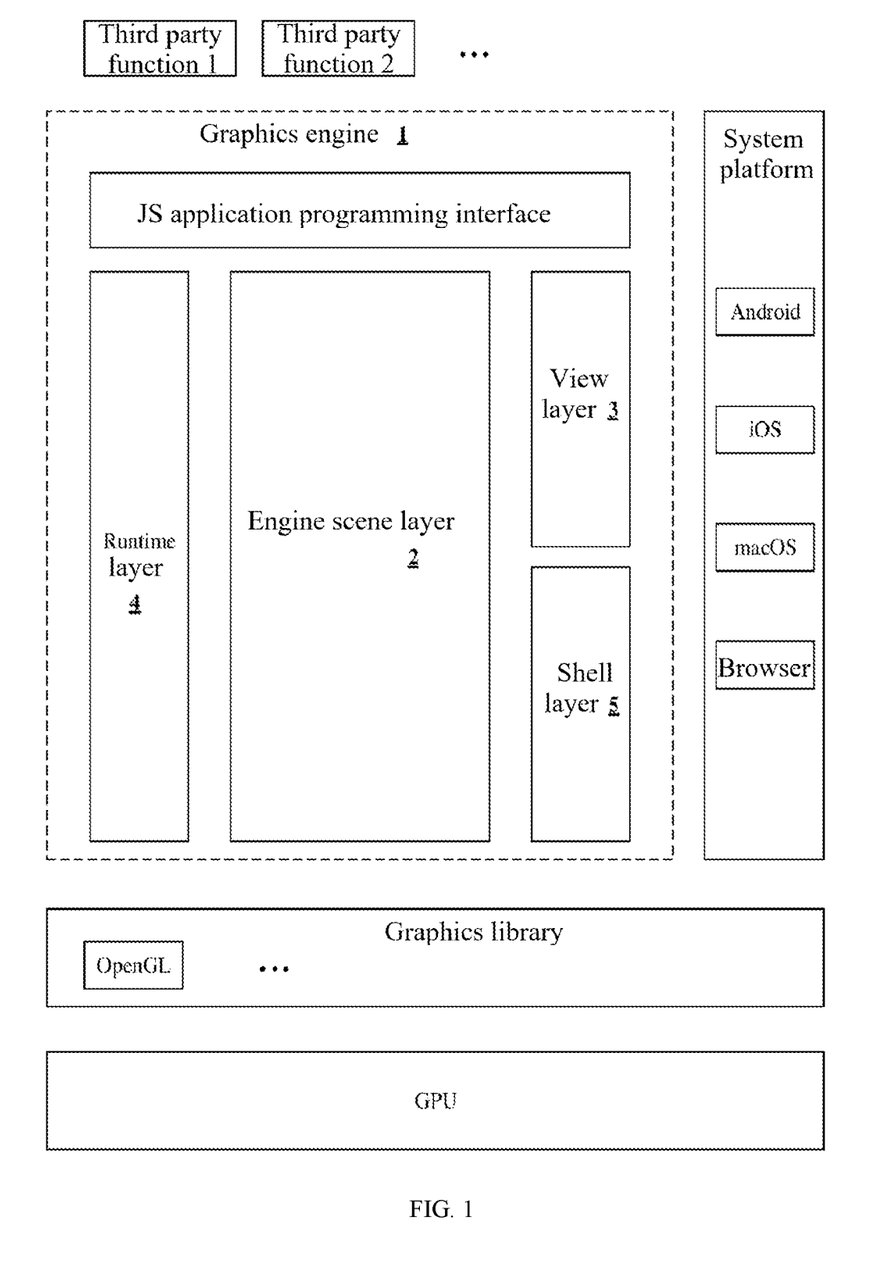
FIG. 1 is an architecture diagram schematically showing a graphics engine according to Embodiment 1 of the present application.

FIG. 1 is an architecture diagram schematically showing a graphics engine 1 according to Embodiment 1 of the present application. The graphics engine 1 may include an engine scene layer, a view layer, a runtime layer, a shell layer, and basic tools of the graphics engine.

(1) Engine Scene Layer (Scene) 2

The engine scene layer 2 is configured to execute a graphics processing operation according to a preset logic,
where executing the graphics processing operation according to the preset logic includes: interacting with a player based on a predetermined transmission protocol to obtain playback data, and executing the graphics processing operation based on the playback data and the preset logic.

The engine scene layer 2 is used as the kernel of the graphics engine 1 and is configured to implement engine functions, and the preset logic (set) is encapsulated in the engine scene layer. These preset logics (sets) may include various types of service realization logics related to control, scene, node or sub-node (Node, SpriteNode, LabelNode), action (Action), texture (Texture), font (Font), Shader (Shader), physical simulation (Simulates Physics), and application constraints (Applies Constraints).

For adaption to the video playing services, a communication mechanism is set between the engine scene layer 2 and the player, such that the engine scene layer 2 and the player interacts with each other in terms of playback data of a video being played, so that the graphics engine 1 can efficiently obtain the playback data for a graphics processing operation, thereby ensuring a video rendering effect.

The playback data may include a video playing progress, a size, a user trigger event on the player, etc.

As an example, the playback data may be the video playing progress of the player. The following takes the bullet-screen comment as an example to give an exemplary description of the role of video playing in the engine scene layer. In the process of watching video programs, users usually interact with live streamers or other users by sending bullet-screen comments. The bullet-screen comment is a subtitle that pops up and moves along a predetermined direction during video watching via the network. There is no fixed term in English for the bullet-screen comment, which is typically referred to as: a comment, danmaku, a barrage, a bullet screen, a bullet-screen comment, or the like. The bullet-screen comment allows users to post comments or thoughts. However, different from display in a dedicated comment area of a player on common video sharing sites, the bullet-screen comment appears on a video screen in real time in the form of a scrolling subtitle, to ensure that it can be noticed by all viewers. It can be learned that the bullet-screen comment pops up on a specific playing node and scrolls across a video playing interface along a predetermined direction. When the engine scene layer 2 is rendering a video frame, it is required to determine a playing position of the video frame in the video (that is, a video playing progress), and the playing position is used to determine a position in the video frame where each bullet-screen comment is drawn. Therefore, the engine scene layer is configured to: determine a bullet-screen comment position of each bullet-screen comment based on the video playing progress and the preset logic.

As an example, the playback data may be request data that is from the player and used for requesting the bullet-screen comment to be closed. The bullet-screen comment continues to be used as an example. When the player receives a user operation of closing the bullet-screen comment, the request data for closing the bullet-screen comment is generated, and the request data for closing the bullet-screen comment is transferred to the engine scene layer by using the preset transmission protocol. When receiving the request data for closing the bullet-screen comment from the player while rendering a video frame, the engine scene layer hides all or some of bullet-screen comments on the video frame. Therefore, the engine scene layer 2 is configured to: hide the bullet-screen comment based on the request data and the preset logic.

In the above exemplary description: data obtained through data interaction between the graphics engine 1 and the player can be used for calculations and graphics rendering of the graphics engine 1. Certainly, which data of the player is to be used by the graphics engine 1 or how to use the data of the player is determined by the preset logic.

(2) View Layer (View) 3

The view layer 3 is configured to transfer a message to the engine scene layer.

The view layer 3 may transfer a message of the player or the system platform to the engine scene layer, and may also transfer a message of the engine scene layer to the player or the system platform. The message includes: a frame update signal (Vsync), a touch event (Touch Event), a scene coordination signal (View Coor), and/or interaction data with the player.

(3) Runtime Layer 4

The runtime layer 4 is configured to run JS codes.

The runtime layer 4 is bound to a JS application programming interface; the JS application programming interface is used as an external open interface of the graphics engine and configured for interaction between the graphics engine and a third-party function module.

By using the runtime layer 4 and the JS application programming interface, developers can develop, according to requirements, extended functions running on the graphics engine, thereby ensuring the expansibility of functions and the high efficiency of performance. The expansibility of this graphics engine provides support for the growth of subsequent service requirements and the expansion of engine functions.

(4) Shell Layer 5

The shell layer 5 is used as an interaction interface between the graphics engine and the system platform and configured to adapt the graphics engine to a target system platform.

The functions of the graphics engine are encapsulated in the shell layer 5, such that the graphics engine can be adapted to various system platforms, and the system platforms can be Android (Android), iOS (Apple's mobile phone operating system), macOS (Apple's desktop computer operating systems), a browser, etc. The shell layer aims to enable the graphics engine to implement supporting of multi-end cross-platform development.

(5) Basic Tools (Base) of the Graphics Engine

The basic tools include logging (Logging), a file system (FileSystem), a task runner (TaskRunner), thread (Thread) management, a clock (Timepoint), a restart, a message cycle, etc.

In this embodiment, the graphics pipeline/rendering pipeline (Graphics pipeline/rendering pipeline) can be implemented by encapsulating the graphics interface, which provides support for implementing the functions of the engine scene layer. The graphics engine pipeline is: a series of orderly processing processes from data being input into the GPU to the data being finally rendered into graphics.

The graphics rendering pipeline involves a render buffer (Renderbuffer), a frame buffer (Framebuffer), a shader, a texture, etc.

Part of the architecture of the graphics engine 1 is listed above, and a general work process of processing a frame by the graphics engine is as follows.

In step A, the view layer 3 receives a frame update signal and forwards the frame update signal to the engine scene layer.

In step B, the engine scene layer 2 starts a processing operation of a next frame of the player based on the frame update signal.

In step C, the engine scene layer 2 processes (such as performing action evaluation, physical simulation, etc.) various data of scene nodes such as video frames and bullet-screen comments based on the playback data and the preset logic, to obtain updated data; and based on the updated data, a Draw Call command can be issued to a graphics processing unit (GPU) or an underlying graphics library (such as OpenGL) can be called to implement the rendering operation. It should be noted that the action evaluation may include various evaluations on a position change, a color change, a transparency change, etc, The shell layer 5 is configured to adapt the graphics engine to the system platform.

The runtime layer 4 may parse and run codes such as JavaScript to expand the functions of the graphics engine.

Figure 2:
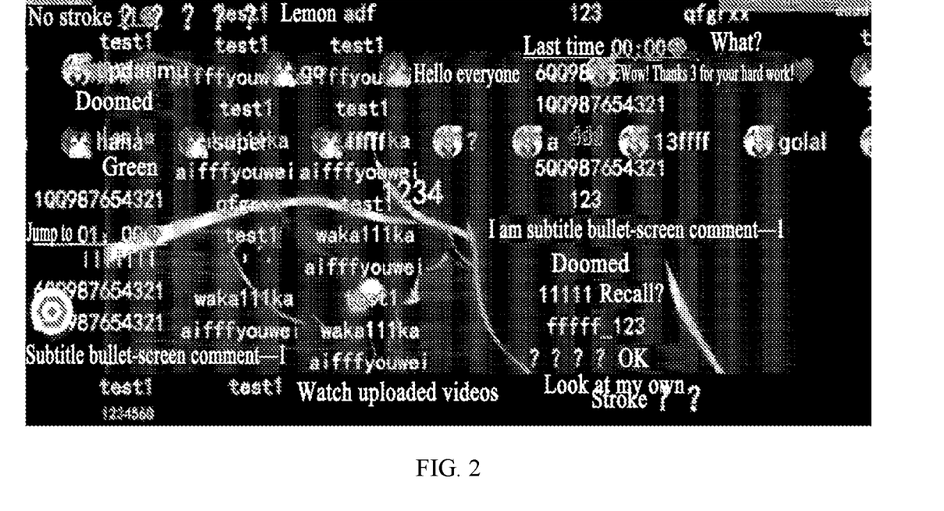
FIG. 2 is a video frame carrying a bullet-screen comment.

In step C, one or more Draw Call commands may be issued for each node, and it takes time to prepare data before issuing each Draw Call command. However, the applicant found that in the actual scene, data prepared for issuing multiple Draw Call commands may be similar. The same data is submitted by using one Draw Call command can reduce the data storage to improve the efficiency, and can also improve the rendering efficiency and reduce the computing resources of the GPU. As shown in FIG. 2, there are a large number of same bullet-screen comment portraits and same bullet-screen comment words in FIG. 2, and resource overheads can be reduced by drawing nodes with the same texture (such as the bullet-screen comment portraits or the bullet-screen comment words) in a combined manner.

However, in the combining process, the following problems need to be solved:

(1) Memory problem of dynamic combining of textures: in order to solve the above problem, the engine scene layer 2 is further configured to: combine a plurality of commonly used textures into one texture, such that more nodes can share the same texture object (Texture Object); and the texture object is configured to store texture data and make the texture data be obtained more efficiently.

(2) Problem of how to reorganize fragments generated by frequent texture changes, the problem of frequent changes of a large number of Chinese texts (especially bullet-screen comment texts), and the problem of the drawing order affecting the Z-axis order: in order to solve the above problems, the combining process of the engine scene layer 2 is as follows.

In step C1, node data of a plurality of nodes in a scene is updated.

In step C2, a plurality of rendering instructions are generated for the plurality of nodes based on the node data of the plurality of nodes, where the plurality of nodes include one or more first rendering nodes that do not require an independent rendering environment and one or more second rendering nodes that require an independent rendering environment.

In step C3, the plurality of rendering instructions are cached into a plurality of rendering queues, where the plurality of rendering queues include a first rendering queue and one or more second rendering queues, the first rendering queue is used to cache a rendering instruction of each first rendering node, and each second rendering queue corresponds to one second rendering node and is used to cache a rendering instruction of a corresponding second rendering node.

In step C4, the plurality of rendering queues are traversed to combine a plurality of rendering instructions having a same target parameter into one rendering batch, to obtain a plurality of rendering batches.

In step C5, a graphics library or hardware is called based on each rendering batch to reduce the number of calling times.

It should be noted that the target parameter may include texture parameters, shader parameters, etc. The one or more second rendering nodes may be a node to be cropped (CropNode), a node to be filtered (EffectNode), etc. Each first rendering node or each second rendering node may have one or more rendering instructions according to requirements.

Embodiment 2

Figure 3:
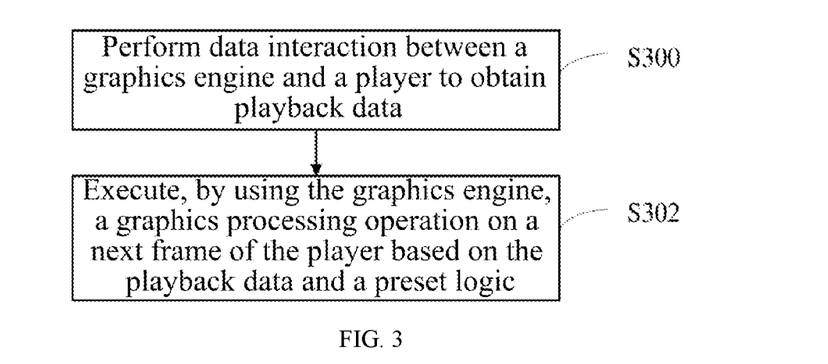
FIG. 3 is a flowchart schematically showing a graphics processing method applicable to a player according to Embodiment 2 of the present application.

FIG. 3 is a flowchart schematically showing a graphics processing method applicable to a player according to Embodiment 2 of the present application. The method may be run in a mobile terminal. As shown in FIG. 3, the method may include steps S300 and S302.

In step S300, data interaction is performed between a graphics engine and the player to obtain playback data.

In step S302, a graphics processing operation is performed on a next frame of the player by using the graphics engine based on the playback data and a preset logic.

The graphics engine may be the graphics engine described in Embodiment 1.

In an exemplary embodiment, a transmission protocol (such as a data format, etc.) for interaction between the graphics engine and the player is pre-agreed on, to implement effective interaction between the graphics engine and the player.

In an exemplary embodiment, the playback data includes a video playing progress of the player.

Figure 4:
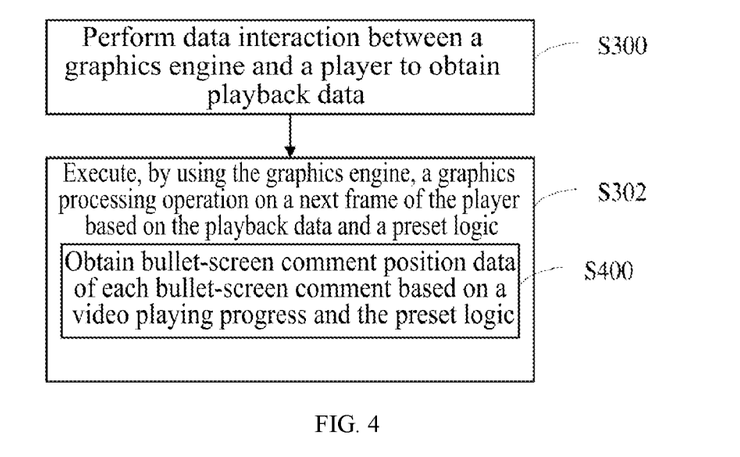
FIG. 4 is a sub-step diagram of step S302 in FIG. 3.

As shown in FIG. 4, step S302 may include step S400: obtaining bullet-screen comment position data of each bullet-screen comment based on the video playing progress and the preset logic. In other words, the interaction data between the graphics engine and the player is used to determine the position of the bullet-screen comment.

Figure 5:
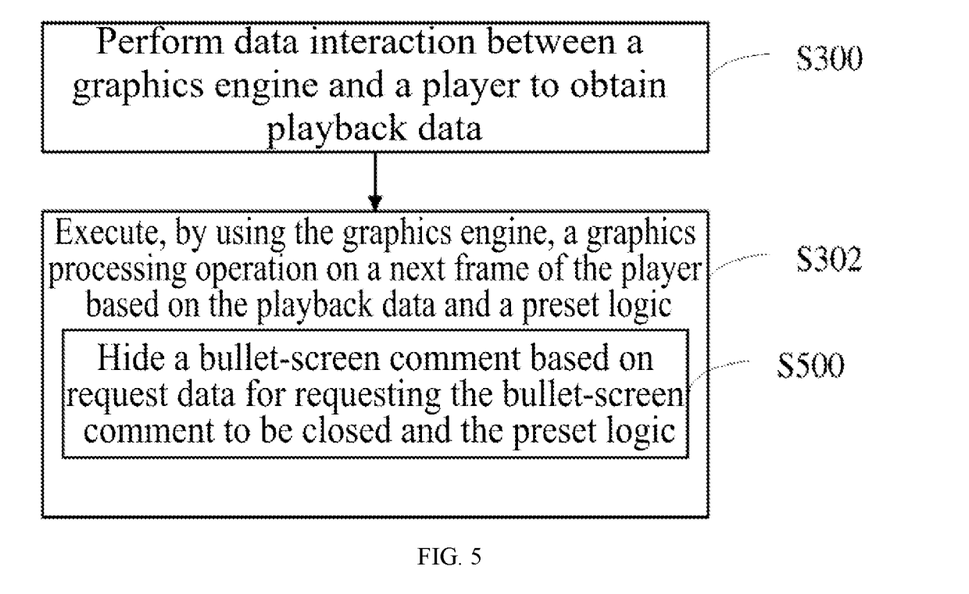
FIG. 5 is another sub-step diagram of step S302 in FIG. 3.

In an exemplary embodiment, the playback data includes request data for requesting the bullet-screen comment to be closed.

As shown in FIG. 5, step S302 may include step S500: hiding the bullet-screen comment based on the request data and the preset logic. In other words, the interaction data between the graphics engine and the player is used for the operation of hiding the bullet-screen comment.

Figure 6:
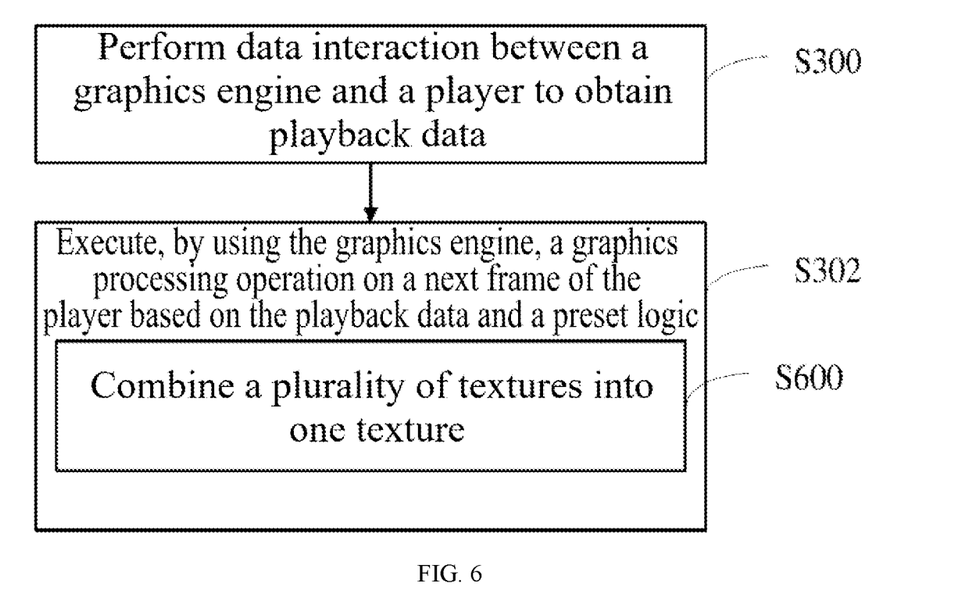
FIG. 6 is another sub-step diagram of step S302 in FIG. 3.

In an exemplary embodiment, as shown in FIG. 6, step S302 may include step S600: combining a plurality of (commonly used) textures into one texture, such that more nodes can share the same texture object to save memory.

Figure 7:
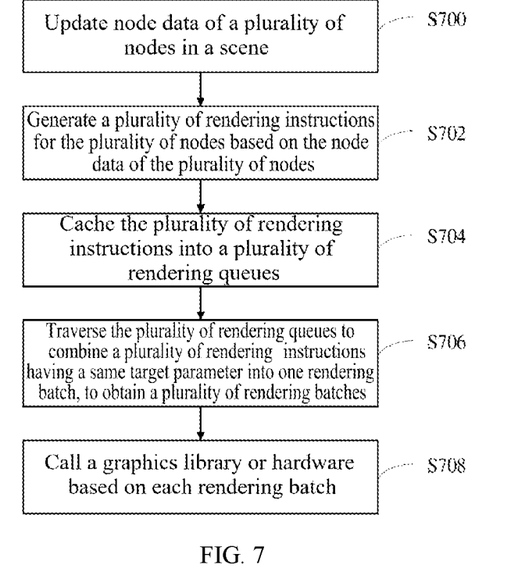
FIG. 7 is another sub-step diagram of step S302 in FIG. 3.

In an exemplary embodiment, as shown in FIG. 7, step S302 may include steps S700 to S708. In step S700, node data of a plurality of nodes in a scene is updated. In step S702, a plurality of rendering instructions are generated for the plurality of nodes based on the node data of the plurality of nodes, where the plurality of nodes include one or more first rendering nodes that do not require an independent rendering environment and one or more second rendering nodes that require an independent rendering environment. In step S704, the plurality of rendering instructions are cached into a plurality of rendering queues, where the plurality of rendering queues include a first rendering queue and one or more second rendering queues, the first rendering queue is used to cache a rendering instruction of each first rendering node, and each second rendering queue corresponds to one second rendering node and is used to cache a rendering instruction of a corresponding second rendering node. In step S706, the plurality of rendering queues are traversed to combine a plurality of rendering instructions having a same target parameter into one rendering batch, to obtain a plurality of rendering batches. In step S708, a graphics library or hardware is called based on each rendering batch. This embodiment may reduce the number of calling times, etc.

Figure 8:
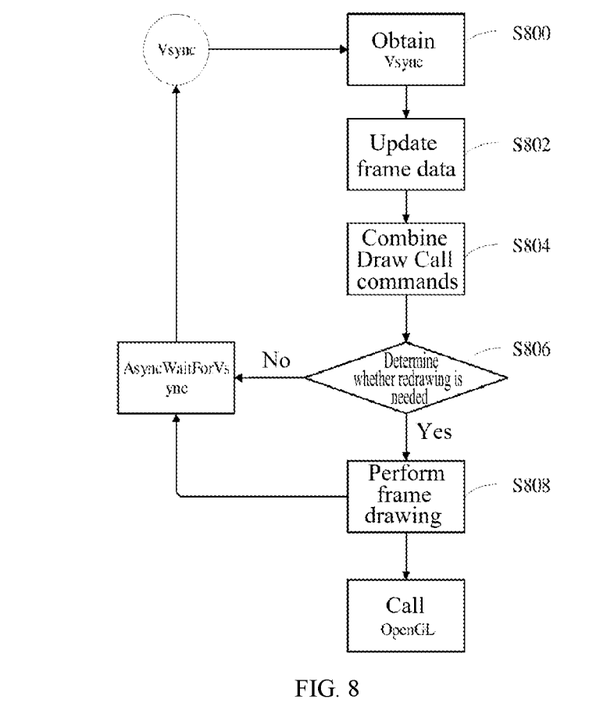
FIG. 8 is a flowchart schematically showing details of rendering a frame.

For ease of understanding, as shown in FIG. 8, an exemplary process is provided below.

In step S800, the graphics engine layer obtains a frame update signal (Vsync) from the system platform by using the view layer.

In step S802, frame data is updated to update node data of a plurality of nodes in a scene.

Step S802 specifically includes: updating the node data of each node in the scene based on the playback data and the preset logic, where the update process of the node data of each node may include action evaluation, physical simulation, etc.

In step S804, Draw Call commands are combined.

Step S804 specifically includes: generating a plurality of rendering instructions for the plurality of nodes based on the node data of the plurality of nodes, caching the plurality of rendering instructions into a plurality of rendering queues, and traversing the plurality of rendering queues to combine a plurality of rendering instructions having a same target parameter into one rendering batch, to obtain a plurality of rendering batches.

In step S806, whether redrawing is needed is determined; and if redrawing is needed, step S802C is performed; or if redrawing is not needed, the processing operation is stopped to wait for a next Vsync asynchronously, where for example, if there is no change between data of a current frame and data of a previous frame, redrawing is not needed.

In step S808, frame drawing is performed, specifically including:
 (1) calling graphics libraries such as OpenGL based on the rendering batches, to render the scene and render the nodes mounted on the scene in a recursive way, where it should be noted that scene drawing may involve camera parameter settings, background cleaning up, etc.; and
 (2) waiting for the next Vsync asynchronously.

Embodiment 3

Figure 9:
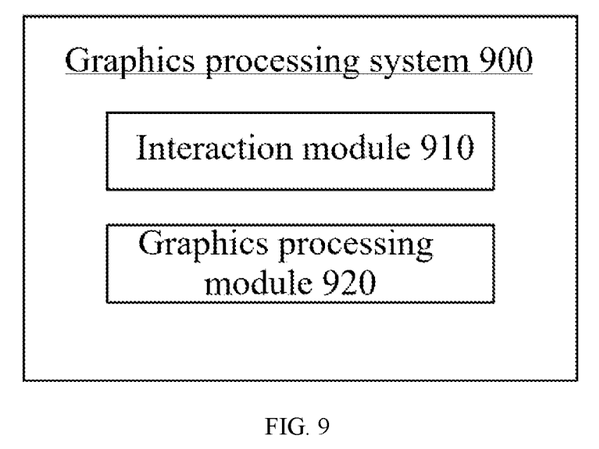
FIG. 9 is a block diagram schematically showing a graphics processing system applicable to a player according to Embodiment 3 of the present application.

FIG. 9 is a block diagram schematically showing a graphics processing system applicable to a player according to Embodiment 3 of the present application. The graphics processing system applicable to a player may be divided into one or more program modules, and the one or more program modules are stored in a storage medium and executed by one or more processors, to implement the embodiments of the present application. The program modules referred to in the embodiments of the present application refer to a series of computer-readable instruction segments that can complete a specific function. The functions of various program modules in the embodiments will be specifically described in the following descriptions.

As shown in FIG. 9, the graphics processing system 900 applicable to a player may include an interaction module 910 and a graphics processing module 920.

The interaction module 910 is configured to perform data interaction between a graphics engine and the player to obtain playback data.

The graphics processing module 920 is configured to execute, by using the graphics engine, a graphics processing operation on a next frame of the player based on the playback data and a preset logic.

In an exemplary embodiment, a transmission protocol for interaction between the graphics engine and the player is pre-agreed on.

In an exemplary embodiment, the playback data includes a video playing progress of the player. The graphics processing module 920 is further configured to: obtain bullet-screen comment position data of each bullet-screen comment based on the video playing progress and the preset logic.

In an exemplary embodiment, the playback data includes request data for requesting the bullet-screen comment to be closed. The graphics processing module 920 is configured to hide the bullet-screen comment based on the request data and the preset logic.

In an exemplary embodiment, the graphics processing module 920 is further configured to: perform action evaluation on a plurality of nodes in a scene based on the preset logic; update node data of each node based on the action evaluation of each node; combine at least some nodes of the plurality of nodes into a plurality of combined nodes based on the node data of each node; and respectively call a graphics library based on each combined node or each uncombined node in the plurality of nodes.

The graphics processing module is configured for the node data including texture data. The graphics processing module 920 is configured to: when the plurality of nodes include a plurality of nodes having the same texture, combine the plurality of nodes into corresponding combined nodes.

In an exemplary embodiment, the graphics processing module 920 is further configured to: combine a plurality of textures into one texture.

In an exemplary embodiment, the graphics processing module 920 is further configured to: update node data of a plurality of nodes in a scene; generate a plurality of rendering instructions for the plurality of nodes based on the node data of the plurality of nodes, where the plurality of nodes include one or more first rendering nodes that do not require an independent rendering environment and one or more second rendering nodes that require an independent rendering environment; cache the plurality of rendering instructions into a plurality of rendering queues, where the plurality of rendering queues include a first rendering queue and one or more second rendering queues, the first rendering queue is used to cache a rendering instruction of each first rendering node, and each second rendering queue corresponds to one second rendering node and is used to cache a rendering instruction of a corresponding second rendering node; traverse the plurality of rendering queues to combine a plurality of rendering instructions having a same target parameter into one rendering batch, to obtain a plurality of rendering batches; and call a graphics library or hardware based on each rendering batch.

Embodiment 4

Figure 10:
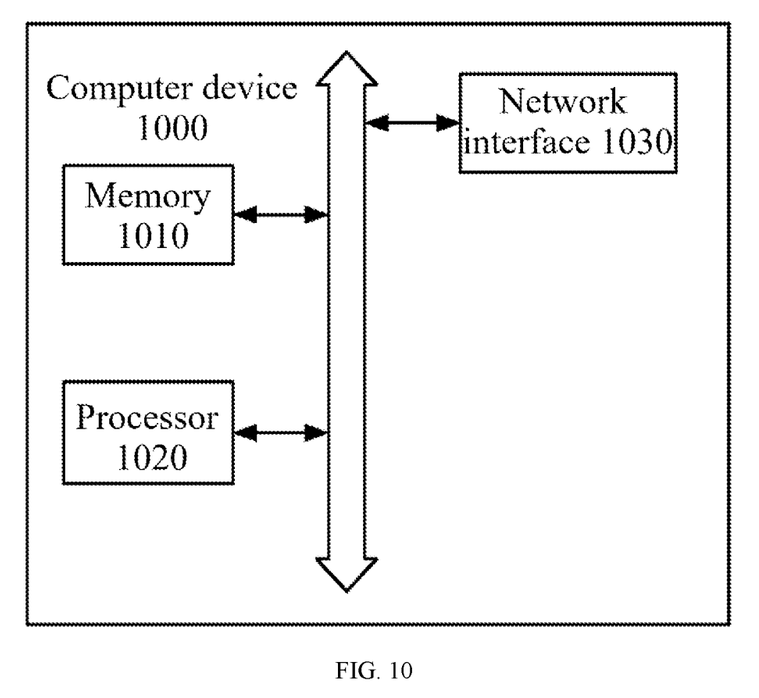
FIG. 10 is a schematic diagram schematically showing a hardware architecture of a computer device adapted to implement a graphics processing method applicable to a player according to Embodiment 4 of the present application.

FIG. 10 is a schematic diagram schematically showing a hardware architecture of a computer device 900 adapted to implement a graphics processing method applicable to a player according to Embodiment 4 of the present application. In this embodiment, the computer device 900 may be a mobile terminal 4 or a part of the mobile terminal 4. In this embodiment, the computer device 900 is a device that can automatically perform numerical calculation and/or information processing based on preset or prestored instructions. For example, the computer device may be a smartphone, a tablet computer, or the like. As shown in FIG. 10, the computer device 900 at least includes, but is not limited to: a memory 1010, a processor 1020, and a network interface 1030, which may be communicatively linked to each other by using a system bus.

The memory 1010 includes at least one type of computer-readable storage medium, and the readable storage medium includes a flash memory, a hard disk, a multimedia card, a card-type memory (for example, an SD or DX memory), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disc, and the like. In some embodiments, the memory 1010 may be an internal storage module of the computer device 900, for example, a hard disk or memory of the computer device 900. In some other embodiments, the memory 1010 may alternatively be an external storage device of the computer device 900, for example, a plug-in type hard disk equipped on the computer device 900, a smart media card (SMC for short), a secure digital (SD for short) card, or a flash card. Certainly, the memory 1010 may alternatively include both the internal storage module of the computer device 900 and the external storage device of the computer device 900. In this embodiment, the memory 1010 is generally configured to store an operating system and various types of application software installed on the computer device 900, such as program codes for a graphics processing method applicable to a player. In addition, the memory 1010 may be further configured to temporarily store various types of data that have been output or are to be output.

The processor 1020 may be, in some embodiments, a central processing unit (CPU for short), a controller, a microcontroller, a microprocessor, or other data processing chips. The processor 1020 is generally configured to control overall operation of the computer device 900, for example, execute control, processing, and the like related to data interaction or communication with the computer device 900. In this embodiment, the processor 1020 is configured to run program code stored in the memory 1010 or to process data.

The network interface 1030 may include a wireless network interface or a wired network interface. The network interface 1030 is generally configured to establish a communication link between the computer device 900 and other computer devices. For example, the network interface 1030 is configured to connect the computer device 900 to an external terminal by using a network, and establish a data transmission channel, a communication link, and the like between the computer device 900 and the external terminal. The network may be a wireless or wired network, such as Intranet, Internet, the Global System for Mobile Communications (GSM for short), wideband code division multiple access (WCDMA for short), a 4G network, a 5G network, Bluetooth, or Wi-Fi.

It should be noted that FIG. 10 shows only a computer device having components 1010 to 1030, but it should be understood that not all of the illustrated components are required to be implemented, and more or fewer components may be implemented instead.

In this embodiment, a graphics processing method applicable to a player stored in the memory 1010 may alternatively be divided into one or more program modules and executed by one or more processors (the processor 1020 in this embodiment) to implement the embodiments of the present application.

Embodiment 5

The present application further provides a computer-readable storage medium storing computer-readable instructions, where when the computer-readable instructions are executed by a processor, the following steps are implemented: performing data interaction between a graphics engine and the player to obtain playback data; and executing, by using the graphics engine, a graphics processing operation on a next frame of the player based on the playback data and a preset logic.

In this embodiment, the computer-readable storage medium includes a flash memory, a hard disk, a multimedia card, a card-type memory (for example, an SD or DX memory), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disc, and the like. In some embodiments, the computer-readable storage medium may be an internal storage unit of the computer device, for example, a hard disk or memory of the computer device. In some other embodiments, the computer-readable storage medium may alternatively be an external storage device of the computer device, for example, a plug-in type hard disk equipped on the computer device, a smart media card (SMC for short), a secure digital (SD for short) card, or a flash card. Certainly, the computer-readable storage medium may alternatively include both the internal storage unit of the computer device and the external storage device of the computer device. In this embodiment, the computer-readable storage medium is generally configured to store an operating system and various types of application software installed on the computer device, such as program codes for a graphics processing method applicable to a player in the embodiments. In addition, the computer-readable storage medium may be configured to temporarily store various types of data that have been output or are to be output.

It will be apparent to those skilled in the art that the various modules or steps in the embodiments of the present application can be implemented by a general-purpose computing apparatus that can be centralized on a single computing apparatus or distributed across a network formed by a plurality of computing apparatuses. Optionally, they may be implemented by program code executable by the computing apparatus, such that they may be stored in a storage apparatus and executed by the computing apparatus, and in some cases, the steps shown or described may be performed in a sequence different from the sequence described herein, or they may be respectively fabricated into individual integrated circuit modules, or a plurality of modules or steps thereof may be implemented as a single integrated circuit module. In this way, the embodiments of the present application are not limited to any specific combination of hardware and software.

It should be noted that most of the existing graphics engines are too "bloated", which is not conducive to the rapid learning of developers.

Comparatively speaking, the graphics engine described in Embodiment 1 of the present application has made targeted improvements especially for the adaptation of the player, and is especially applicable to situations with fast iteration and high effectiveness in the bullet-screen comment activity scene. In the graphics engine described in Embodiment 1 of the present application, based on the core requirements of video playing services, the functions of the engine are met and the engine is extremely "lightweight" by encapsulating the graphics interface and the engine logic. Developers are enabled to quickly learn and develop their required programs, and ensure that the volume of the programs is as small as possible. In addition, further on this basis, the engine logic, views and tools of the graphics engine are adapted to different platform interfaces, such that the service logic of different platform engines can be unified, and it can be quickly deployed on a plurality of platforms. The JS application programming interface is provided to provide calling services for the graphics engine, which ensures the expansibility of functions and high efficiency of performance.

With regard to the interaction with the player, the transmission protocol and data encapsulation format between a playing page of the player and the graphics engine can be agreed on, and the methods for both the playing page and the graphics engine to receive information can be encapsulated, to establish the communication mechanism between the playing page and the graphics engine. For example, the graphics engine performs an addition operation "6+8", and the engine scene layer of the graphics engine may send an addition method request to the player with the parameters 6 and 8. After receiving the request, the player returns a calculation result to the engine scene layer.

Request information for the above method may be as follows:

```
Request{
    "method": "Add",
    "args": {
        "adder1": 6,
        "adder2": 8
    }
}
```

The player may return the following information:

```
{ "result": {
    "sum": 14
    }
}
```

It should be noted that the foregoing descriptions are merely preferred embodiments of the present application, and are not intended to limit the patent scope of the present application. Any transformation of equivalent structures or equivalent processes that is made using the contents of the description and accompanying drawings of the present application, or any direct or indirect application thereof in other related technical fields shall equally fall within the patent protection scope of the present application.

What is claimed is:

1. A graphics engine, comprising:
    an engine scene layer configured to execute graphics processing operations according to a preset logic, wherein executing the graphics processing operations according to the preset logic comprises:
    interacting with a player based on a predetermined transmission protocol to obtain playback data, wherein the player is configured to play videos, and wherein a communication mechanism is set between the engine scene layer and the player such that they are capable of interacting with each other regarding the playback data of a video being played, and
    executing the graphics processing operations based on the playback data and the preset logic, and wherein the engine scene layer is further configured to:
    update node data of a plurality of nodes in a scene;
    generate a plurality of rendering instructions for the plurality of nodes based on the node data of the plurality of nodes, wherein the plurality of nodes comprise one or more first rendering nodes that do not require an independent rendering environment and one or more second rendering nodes that require an independent rendering environment;

cache the plurality of rendering instructions into a plurality of rendering queues, wherein the plurality of rendering queues comprise a first rendering queue and one or more second rendering queues, the first rendering queue is configured to cache a rendering instruction of each first rendering node, and each second rendering queue corresponds to one second rendering node and is configured to cache a rendering instruction of a corresponding second rendering node;

traverse the plurality of rendering queues to combine rendering instructions into one rendering batch based on determining that the rendering instructions have a same target parameter, to obtain a plurality of rendering batches; and call a graphics library or hardware based on each of the plurality of rendering batches.

2. The graphics engine according to claim 1,
wherein the playback data comprises information indicating a progress of playing the video by the player; and
wherein the executing the graphics processing operations based on the playback data and the preset logic comprises:
determining position data of each bullet-screen comment based on the progress and the preset logic, wherein bullet-screen comments are configured to move across video frames on an interface of playing the video.

3. The graphics engine according to claim 1,
wherein the playback data comprises request data for requesting bullet-screen comments to be closed; and
wherein the executing the graphics processing operations based on the playback data and the preset logic comprises hiding the bullet-screen comments based on the request data and the preset logic.

4. The graphics engine according to claim 1, further comprising:
a view layer configured to transfer a message to the engine scene layer, wherein the message comprises a frame update signal, information indicative of a touch event, a scene coordinate signal, and interaction data with the player.

5. The graphics engine according to claim 1, further comprising:
a runtime layer configured to run JavaScript (JS) codes, wherein the runtime layer is bound to a JS application programming interface, wherein the JS application programming interface serves as an external open interface of the graphics engine and is configured to implement interactions between the graphics engine and a third-party function module.

6. The graphics engine according to claim 1, further comprising:
a shell layer, wherein the shell layer serves as an interaction interface between the graphics engine and a system platform and is configured to adapt the graphics engine to a target system platform among a plurality of system platforms.

7. The graphics engine according to claim 1, wherein the engine scene layer is further configured to combine a plurality of textures into one texture.

8. A graphics processing method applicable to a player, comprising:

performing data interaction between a graphics engine and the player to obtain playback data, wherein the graphics engine is configured to execute graphics processing operations based on a preset logic, wherein the player is configured to play videos, wherein a communication mechanism is set between the graphics engine and the player such that they are capable of interacting with each other regarding the playback data of a video being played, and wherein the video comprises a plurality of frames; and executing, by the graphics engine, a graphics processing operation on a next frame of the player based on the playback data and the preset logic, wherein the graphics engine is further configured to perform operations comprising:

updating node data of a plurality of nodes in a scene, generating a plurality of rendering instructions for the plurality of nodes based on the node data of the plurality of nodes, wherein the plurality of nodes comprise one or more first rendering nodes that do not require an independent rendering environment and one or more second rendering nodes that require an independent rendering environment, caching the plurality of rendering instructions into a plurality of rendering queues, wherein the plurality of rendering queues comprise a first rendering queue and one or more second rendering queues, the first rendering queue is configured to cache a rendering instruction of each first rendering node, and each second rendering queue corresponds to one second rendering node and is configured to cache a rendering instruction of a corresponding second rendering node, traversing the plurality of rendering queues to combine rendering instructions into one rendering batch based on determining that the rendering instructions have a same target parameter, to obtain a plurality of rendering batches, and calling a graphics library or hardware based on each of the plurality of rendering batches.

9. The graphics processing method according to claim 8, comprising:
establishing a pre-agreed transmission protocol for interactions between the graphics engine and the player.

10. The graphics processing method according to claim 8,
wherein the playback data comprises information indicating a progress of playing the video by the player; and
wherein the executing, by the graphics engine, the graphics processing operation on the next frame comprises:
determining position data of each bullet-screen comment based on the progress and the preset logic, wherein bullet-screen comments are configured to move across video frames on an interface of playing the video.

11. The graphics processing method according to claim 8,
wherein the playback data comprises request data for requesting bullet-screen comments to be closed; and
wherein the executing, by the graphics engine, the graphics processing operation on the next frame comprises hiding the bullet-screen comments based on the request data and the preset logic.

12. The graphics processing method according to claim 8, further comprising:
combining a plurality of textures into one texture by the graphics engine.

13. A computer device, comprising a memory, a processor, and computer-readable instructions stored in the memory and executable by the processor, wherein execution of the computer-readable instructions by the processor causes the processor to perform operations comprising:

performing data interaction between a graphics engine and a player to obtain playback data, wherein the graphics engine is configured to execute graphics processing operations based on a preset logic, wherein the player is configured to play videos, wherein a communication mechanism is set between the graphics engine and the player such that they are capable of interacting with each other regarding the playback data of a video being played, and wherein the video comprises a plurality of frames; and executing, by the graphics engine, a graphics processing operation on a next frame of the player based on the playback data and the preset logic, wherein the graphics engine is further configured to perform acts comprising:

updating node data of a plurality of nodes in a scene, generating a plurality of rendering instructions for the plurality of nodes based on the node data of the plurality of nodes, wherein the plurality of nodes comprise one or more first rendering nodes that do not require an independent rendering environment and one or more second rendering nodes that require an independent rendering environment, caching the plurality of rendering instructions into a plurality of rendering queues, wherein the plurality of rendering queues comprise a first rendering queue and one or more second rendering queues, the first rendering queue is configured to cache a rendering instruction of each first rendering node, and each second rendering queue corresponds to one second rendering node and is configured used to cache a rendering instruction of a corresponding second rendering node, traversing the plurality of rendering queues to combine rendering instructions into one rendering batch based on determining that the rendering instructions have a same target parameter, to obtain a plurality of rendering batches, and calling a graphics library or hardware based on each of the plurality of rendering batches.

14. The computer device according to claim 13, the operations further comprising:
establishing a pre-agreed transmission protocol for interactions between the graphics engine and the player.

15. The computer device according to claim 13,
wherein the playback data comprises information indicating a progress of playing the video by the player, and wherein the executing, by the graphics engine, the graphics processing operation on the next frame comprises determining position data of each bullet-screen comment based on the progress and the preset logic, wherein bullet-screen comments are configured to move across video frames on an interface of playing the video; or
wherein the playback data comprises request data for requesting bullet-screen comments to be closed, and wherein the executing, by the graphics engine, the graphics processing operation on the next frame comprises hiding the bullet-screen comments based on the request data and the preset logic.

16. A non-transitory computer-readable storage medium storing computer-readable instructions that may be executed by at least one processor to cause the at least one processor to execute operations comprising:
performing interactions between a graphics engine and a player to obtain playback data, wherein the graphics engine is configured to execute graphics processing operations based on a preset logic, wherein the player is configured to play videos, wherein a communication mechanism is set between the graphics engine and the player such that they are capable of interacting with each other regarding the playback data of a video being played, and wherein the video comprises a plurality of frames; and executing, by the graphics engine, a graphics processing operation on a next frame of the player based on the playback data and the preset logic, wherein the graphics engine is further configured to perform acts comprising:

updating node data of a plurality of nodes in a scene, generating a plurality of rendering instructions for the plurality of nodes based on the node data of the plurality of nodes, wherein the plurality of nodes comprise one or more first rendering nodes that do not require an independent rendering environment and one or more second rendering nodes that require an independent rendering environment, caching the plurality of rendering instructions into a plurality of rendering queues, wherein the plurality of rendering queues comprise a first rendering queue and one or more second rendering queues, the first rendering queue is configured to cache a rendering instruction of each first rendering node, and each second rendering queue corresponds to one second rendering node and is configured used to cache a rendering instruction of a corresponding second rendering node, traversing the plurality of rendering queues to combine rendering instructions into one rendering batch based on determining that the rendering instructions have a same target parameter, to obtain a plurality of rendering batches, and calling a graphics library or hardware based on each of the plurality of rendering batches.

17. The computer device according to claim 13, the operations further comprising:
combining a plurality of textures into one texture by the graphics engine.

18. The non-transitory computer-readable storage medium according to claim 16, the operations comprising:
establishing a pre-agreed transmission protocol for interactions between the graphics engine and the player.

19. The non-transitory computer-readable storage medium according to claim 16,
wherein the playback data comprises information indicating a progress of playing the video by the player, and wherein the executing, by the graphics engine, the graphics processing operation on the next frame comprises determining position data of each bullet-screen comment based on the progress and the preset logic, wherein bullet-screen comments are configured to move across video frames on an interface of playing the video; or
wherein the playback data comprises request data for requesting bullet-screen comments to be closed, and wherein the executing, by the graphics engine, the graphics processing operation on the next frame comprises hiding the bullet-screen comments based on the request data and the preset logic.

20. The non-transitory computer-readable storage medium according to claim 16, the operations further comprising:

combining a plurality of textures into one texture by the graphics engine.

* * * * *